(12) United States Patent
Martini

(10) Patent No.: US 9,092,613 B2
(45) Date of Patent: Jul. 28, 2015

(54) DEVICE AUTHENTICATION USING PROXY AUTOMATIC CONFIGURATION SCRIPT REQUESTS

(71) Applicant: Phantom Technologies, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 149 days.

(21) Appl. No.: 13/951,359

(22) Filed: Jul. 25, 2013

(65) Prior Publication Data

US 2015/0033298 A1 Jan. 29, 2015

(51) Int. Cl.
G06F 21/44 (2013.01)

(52) U.S. Cl.
CPC ..................................... G06F 21/44 (2013.01)

(58) Field of Classification Search
CPC ......... H04L 67/02; G06F 21/30; G06F 21/44; G06F 17/30171
USPC .............................................. 726/5, 9, 12, 29
See application file for complete search history.

(56) References Cited

U.S. PATENT DOCUMENTS

| 8,166,141 B1* | 4/2012 | Van Horne, III | 709/223 |
| 2006/0031407 A1* | 2/2006 | Dispensa et al. | 709/219 |
| 2008/0082662 A1* | 4/2008 | Dandliker et al. | 709/225 |
| 2010/0146275 A1* | 6/2010 | Slick et al. | 713/169 |
| 2011/0231479 A1* | 9/2011 | Boydstun et al. | 709/203 |

OTHER PUBLICATIONS

On Defining an Hierarchical Secure Proxy Agent Architecture for Embedded Communication Network Applications, Karras, Dimitrios, IEEE, Nov. 20-22, 2012.*
Optimized Client Side Solution for Cross Site Scripting, Tiwari et al, IEEE 2008.*
'code.google.com' [online]. "Chromium—an open source project to help move the web forward," Mar. 2011, [retrieved on Jul. 26, 2013]. Retrieved from the Internet: URL<https://code.google.com/p/chromium/issues/detal?id=77366>. 3 pages.
'msdn.microsoft.com' [online]. "WinHTTP AutoProxy Functions," Jun. 2013, [retrieved on Jul. 26, 2013]. Retrieved from the Internet: URL<msdn.microsoft.com/en-us/library/windows/desktop/aa384122(v=vs.85).aspx>. 4 pages.
'wavezgrp.wordpress.com' [online]. "Wavezgrp—Load Runner: Proxy Authentication," Feb. 2011, [retrieved on Jul. 26, 2013]. Retrieved from the Internet: URL<wavezgrp.wordpress.com/2011/02/11/loadrunner-proxy-authentication/>. 5 pages.

* cited by examiner

Primary Examiner — Luu Pham
Assistant Examiner — Jahangir Kabir
(74) Attorney, Agent, or Firm — Fish & Richardson P.C.

(57) ABSTRACT

Methods and systems for performing device authentication using proxy automatic configuration script requests are described. One example method includes generating a unique key for a client device; configuring the client device to send a request for a proxy automatic configuration (PAC) script upon accessing a network, the request including the unique key; receiving, over a network, a request for the PAC script including a request key; and authenticating the client device on the network if the request key matches the client device's unique key.

13 Claims, 4 Drawing Sheets

DEVICE AUTHENTICATION USING PROXY AUTOMATIC CONFIGURATION SCRIPT REQUESTS

BACKGROUND

This specification generally relates to performing device authentication using proxy automatic configuration script requests.

In corporate and other networks, users may be required to authenticate to a proxy server prior to accessing the Internet. One widely used authentication scheme is HyperText Transfer Protocol (HTTP) Basic Authentication (Basic Auth). In Basic Auth, a client sends its username and password in unencrypted plaintext to a server, such as, for example, a proxy server. The server authenticates the client and subsequently allows the client access to other resources, such as the Internet. In such a configuration, an attacker can monitor network packets to obtain the username and password of the client, and possibly compromise the security of the network.

SUMMARY

In general, one aspect of the subject matter described in this specification may be embodied in systems, and methods performed by data processing apparatuses that include the actions of generating a unique key for a client device; configuring the client device to send a request for a proxy automatic configuration (PAC) script upon accessing a network, the request including the unique key; receiving, over a network, a request for the PAC script including a request key; and authenticating the client device on the network if the request key matches the client device's unique key.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A proxy server often is used by a network owner or administrator to control access to an external network, such as the Internet, by users of an internal network, such as a Local Area Network (LAN). A proxy server may also save Internet bandwidth and/or provide security by filtering users' access to objectionable or dangerous Internet sites. In some implementations, proxy server settings for individual network devices may be contained in proxy automatic configuration (PAC) scripts. When a network device joins a network, it may request a PAC script from a network management system, such as a mobile device management (MDM) system. In some cases, the device may request the PAC script from a pre-configured location, such as at a specified Uniform Resource Locator (URL) associated with the network management system. The network management system may then respond with a PAC script file including instructions for use by the device in accessing the proxy server.

The present disclosure describes, among other things, techniques for allowing device authentication on a network based on characteristics of the PAC script request sent by the device. In one example, the PAC script URL sent by the device includes a unique key for the device. The network management system receiving such a request from a device parses the request to extract the unique key, and compares this received key to the unique key stored for the device. If the keys match, the device is authenticated on the network. Once the device is authenticated, the user may be directed to a secure website for a second stage of authentication to authenticate the user of the device based on user-specific credentials.

This approach has several potential advantages. First, it leverages an established procedure for proxy configuration provisioning that is deployed across the industry. For this reason, the present approach may be less costly and/or complicated to implement in existing systems. Further, the present approach provides increased security over other network authentication mechanisms such as, for example, Basic Auth.

Figure 1:
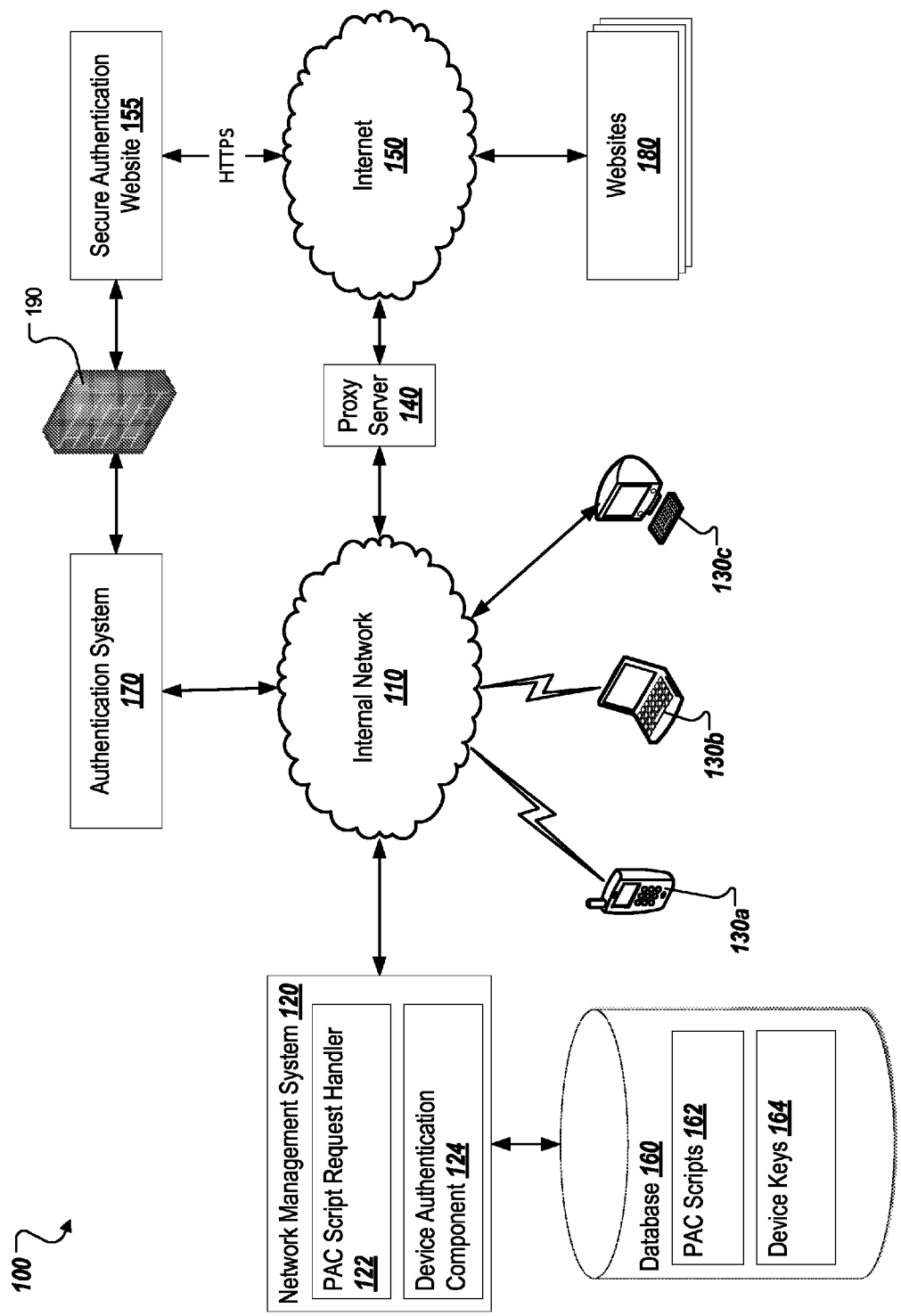
FIG. 1 is a diagram of an example environment.

FIG. 1 is a diagram of an example environment 100 in which various aspects of the subject matter described here may be implemented. The example environment 100 includes an internal network 110 connecting one or more devices 130a-c to a network management system 120. The network management system 120 is connected to a database 160. An authentication system 170 is connected to the internal network 110 and to a firewall 190 through which it communicates to a secure authentication website 155. The proxy server 140 separates the internal network 110 from the Internet 150. A plurality of websites 180 are connected to the Internet 150.

In one example implementation, the example environment 100 allows the devices 130a-c to be authenticated based on the location of a PAC script requested from the network management system 120. In such an implementation, each of the one or more devices 130a-c is configured with a PAC script URL. The devices 130a-c may be configured by the network management system 120, a mobile device management (MDM) system, and/or other systems. Each PAC script URL contains a unique key associated with the device. For example, the PAC script URL for device 130a may be "https://example.com/script-12345.pac", where "12345" is a unique key assigned to device 130a.

When each of the one or more devices 130a-c connects to the internal network 110, the device requests a PAC script from its configured PAC script URL. For instance, in the example above, the device 130a may connect to the host "example.com" and request the PAC script named "script-12345.pac." The network management system 120 receives the PAC script request, and parses the request to extract the unique key. For example, the network management system 120 may parse the PAC script name "script-12345.pac" to extract the unique key "12345." The network management system 120 then authenticates the requesting device based on the unique key. If authentication is successful, network management system 120 responds to the device with a PAC script containing the proxy configuration for the device. If authentication is unsuccessful, the network management system 120 may indicate to the device that it cannot be authenticated.

As shown, the example environment 100 includes an internal network 110. In some implementations, the internal network 110 may be a wireless network provided by a corporation, educational institution, municipality, business, or other entity. Such a wireless network may utilize any standard wireless networking technology, including 802.11a, 802.11b, 802.11g, 802.11n, LTE, WiMax, CDMA or any other suitable wireless networking technology. In such implementations, the wireless network may be a public network in the sense that any device within range may connect to the network. Even though any device within range may connect to the internal network 110 in such configurations, the device still may be required to authenticate in order to access resources on the internal network 110 and/or on the Internet 150. Such a configuration is often referred to as a Bring Your Own Device (BYOD) network in which users are free to use their own personal devices for connecting to the network. In some implementations, the entity that controls the internal network 110 may issue devices to users for use on the internal network 110. The internal network 110 may also be a wired network, such as an Ethernet network.

One or more devices 130a-c are connected to the internal network 110. In some implementations, the one or more devices 130a-c include mobile devices, such as cellular telephones (e.g., 130a), smartphones, tablets, laptops (e.g., 130b) and other similar computing devices. The one or more devices 130a-c may also include wired devices such as desktop computer 130c. In some implementations, the one or more devices 130a-c include personal devices associated with one or more users. The one or more devices 130a-c may also include devices issued or owned by the entity that provides the internal network 110, such as company-issued smartphones or laptops. In some implementations, the one or more devices 130a-c may include network access or web browsing software (e.g., a web browser) for accessing resources on the Internet 150.

A network management system 120 is also connected to the internal network 110. In some implementations, the network management system 120 may be a computing device or set of devices operable to manage configuration information associated with the one or more devices 130a-c. The network management system 120 may include an MDM system for managing configuration information associated with mobile and other devices. In some cases, the network management system 120 may include the proxy server 140, the authentication system 170, and/or other components.

As shown, the network management system 120 includes a PAC script request handler 122. In some implementations, the PAC script request handler 122 may be operable to receive PAC script requests from the one or more devices 130a-c. The PAC script request may be received via the Hypertext Transfer Protocol (HTTP), and may include a URL associated with the requested PAC script. The PAC script request handler 122 may parse the received request to extract the unique key. For example, the PAC script request handler may receive an HTTP request including the URL "https://example.com/script-12345.pac" from the device 130a, and may parse the request to extract the unique key "12345" from the request URL.

In some implementations, the unique key may be included in another part of the request URL, such as in a directory name. The unique key may also be included as a common gateway interface (CGI) parameter, an HTTP header, and/or another part of the request. The request may also be sent according to other protocols besides HTTP, including, but not limited to, Dynamic Host Configuration Protocol (DHCP), Bootstrap Protocol (BOOTP), HTTP Secure (HTTPS) and/or other protocols.

In some implementations, the PAC script request handler 122 may also identify the device that sent the PAC script request. For example, the PAC script request handler 122 may identify the Medium Access Control (MAC) address associated with the device that sent the request, and/or another address or characteristic associated with the device.

The network management system 120 also includes a device authentication component 124. In some implementations, the device authentication component 124 is operable to receive as input the unique key parsed from the PAC script request by the PAC script request handler 122, and query the database 160 for the device associated with the unique key. The device authentication component may then compare the device that sent the request with the device associated with the received unique key. If the devices match, the device authentication component 124 may return a PAC script file associated with the device to the requesting device. If the device do not match, the device authentication component 124 may return an indication that authentication has failed.

In one example, the device authentication component 124 may receive the unique key "12345" and the MAC address "46575" from the PAC script request handler 122. The device authentication component 124 queries the database 160 for the MAC address of the device assigned a unique key "12345." If the database 160 returns MAC address "46575," then authentication is successful. If the database 160 returns a MAC address other than MAC address "46575," then authentication is not successful. If authentication is successful, the device authentication component 124 may query the database 160 for a PAC script associated with the requesting device, and return the PAC script to the device to indicate that authentication was successful. If authentication is not successful, the device authentication component 124 may perform an action to restrict or prohibit the requesting device from accessing the network, such as, for example, returning a PAC script with an invalid proxy address, returning a PAC script with the proxy address that will display a page indicating that authentication was not successful when the device tries to access the Internet, and/or other actions.

The example environment 100 also includes a database 160. The database 160 may be one of or a combination of several commercially available database and non-database products. Acceptable products include, but are not limited to Oracle® databases, IBM® Informix® or DB2® databases, MySQL, Microsoft SQL Server®, Ingres®, PostgreSQL, Teradata, Amazon SimpleDB, and Microsoft® Excel, as well as other database and non-database products. Further, database 160 may be operable to process queries specified in any structured or other query language such as, for example, Structured Query Language (SQL). In some implementations, the database 160 may be a file system or storage structure located on separate from or co-located with the network management system 120. The database 160 may also be or set of files within such a file system including configuration information related to the network management system 120.

Database 160 includes PAC scripts 162. In some implementations, the PAC scripts 162 may be collections of instructions to be executed by a device in order to access the Internet 150. The following is an example PAC script:

```
function FindProxyForURL(url,host)
{
   if(isResolvable("mydomain.local"))
   {
      return "DIRECT";
   }
   else
   {
      return "PROXY username:password@1.2.3.4";
   }
}
```

This example PAC script will cause the receiving device to access local addresses directly, while using the proxy server "1.2.3.4" for all other requests. In this example, the PAC script is implemented in the JavaScript language. The PAC scripts 162 may include instructions written in other languages including Python, Perl, PHP, and/or other languages.

In some implementations, the PAC scripts 162 may include one or more standard PAC scripts to be provided to the one or more devices 130a-c. Even though each of the devices may request a different PAC script URL including the unique key, each of the one or more devices may be provided with the same PAC script. The PAC script URL may not correspond to an actual PAC script file stored in the database 160 or elsewhere, and may serve merely as a vector for delivering the unique key to the network management system 120. In some implementations, the requested PAC script may be generated upon receipt of the request by the network management system 120.

Database 160 also includes device keys 164. The device keys 164 may include mappings of device identifiers to unique keys. In some implementations, the device identifiers may be unique identifiers for the devices 130a-c, including MAC addresses, IP addresses, and/or other identifiers. The unique keys may be keys generated and assigned to the devices by the network management system 120. In some implementations, the unique keys may be alphanumeric strings including a predetermined number of characters. The unique keys may also be integer values, MD5 or other hashes, URLs and/or other values.

The proxy server 140 connects the internal network 110 to the Internet 150. As shown, the environment 100 also includes a proxy server 140 connected to the internal network 110 and the Internet 150. In some implementations, the proxy server 140 search is a gateway to a wide-area network (WAN), such as the Internet 150, for the one or more devices 130a-c. Requests made by the devices may be first passed to the proxy server 140, which will then pass the request on to the Internet 150. In some implementations, the proxy server 140 may perform filtering on these requests, such as blocking access to resources on the Internet 150 that are known to include objectionable or otherwise prohibited content. Proxy server 140 may perform this filtering by analyzing requests sent by the one or more devices 130a-c, identifying requests for Uniform Resource Locators (URLs) of known prohibited sites, and returning a response to the sending device indicating that the request will not be fulfilled.

As shown, the proxy server 140 is connected to the Internet 150. In some implementations, the Internet 150 is the public Internet. The Internet 150 may also be any network or combination of networks accessed from the internal network 110 via the proxy server 140. In such an implementation, the Internet 150 may be public, private, or a combination of the two. In some implementations, the Internet 150 is a distributed network utilizing the Transmission Control Protocol (TCP) in combination with HTTP to transmit requests for pages to web servers connected to the Internet 150, and to transmit responses from the web servers to the requesting clients.

The example environment 100 also includes a secure authentication website 155 connected to the Internet 150. In some implementations, the secure authentication website 155 is accessed by the one or more devices 130a-c via the proxy server 140. The one or more devices 130a-c may access the secure authentication website using a secure communications method, such as, for example, HTTPS. The secure authentication website 155 may prompt the user of the one or more devices for user-specific credentials. In some locations, the user-specific credentials may include a username and password, a certificate, an encryption key, the token, or any other suitable credentials or combination of credentials. Because the user-specific credentials are transmitted using the secure communications method, an attacker cannot easily obtain the user-specific credentials by simply sniffing on the internal network 110. An attacker may be able to learn the device-specific credentials by sniffing on internal network 110, but knowing these credentials may only allow the attacker to access the secure authentication website 155. In some implementations, the attacker may not be able to gain access to other parts of the internal network 110 because the proxy server 140 may restrict access of a device that has only authenticated with a device-specific username. Such a device may only be permitted to access the secure authentication website 155, and thus may not be able gain access to other components on the internal network 110, such as the authentication system 170.

When the user-specific credentials are received by the secure authentication website 155, the secure authentication website 155 communicates with the authentication system 170 to verify the user-specific credentials. This communication may occur through one or more security mechanisms, such as, for example, firewall 190. If the user-specific credentials are verified, the device associated with the user may be placed into a less restrictive profile allowing it to access additional websites in addition to the secure authentication website, such as, for example, the one or more websites 180.

In some implementations, after the user-specific credentials are received and verified, the proxy server 140 may associate each request received from the one or more devices 130a-c with the specific user currently using the device in question. This association may occur by examining the device-specific credentials received with the request and determining the currently associated user-specific credentials. In some implementations, the proxy server 140 may apply a user-specific profile to requests from the one or more devices 130a-c based on the associated user-specific credentials. In some instances, the proxy server 140 may use the correlation between user and device to log users off of shared devices after a maximum usage time is reached.

Figure 2:
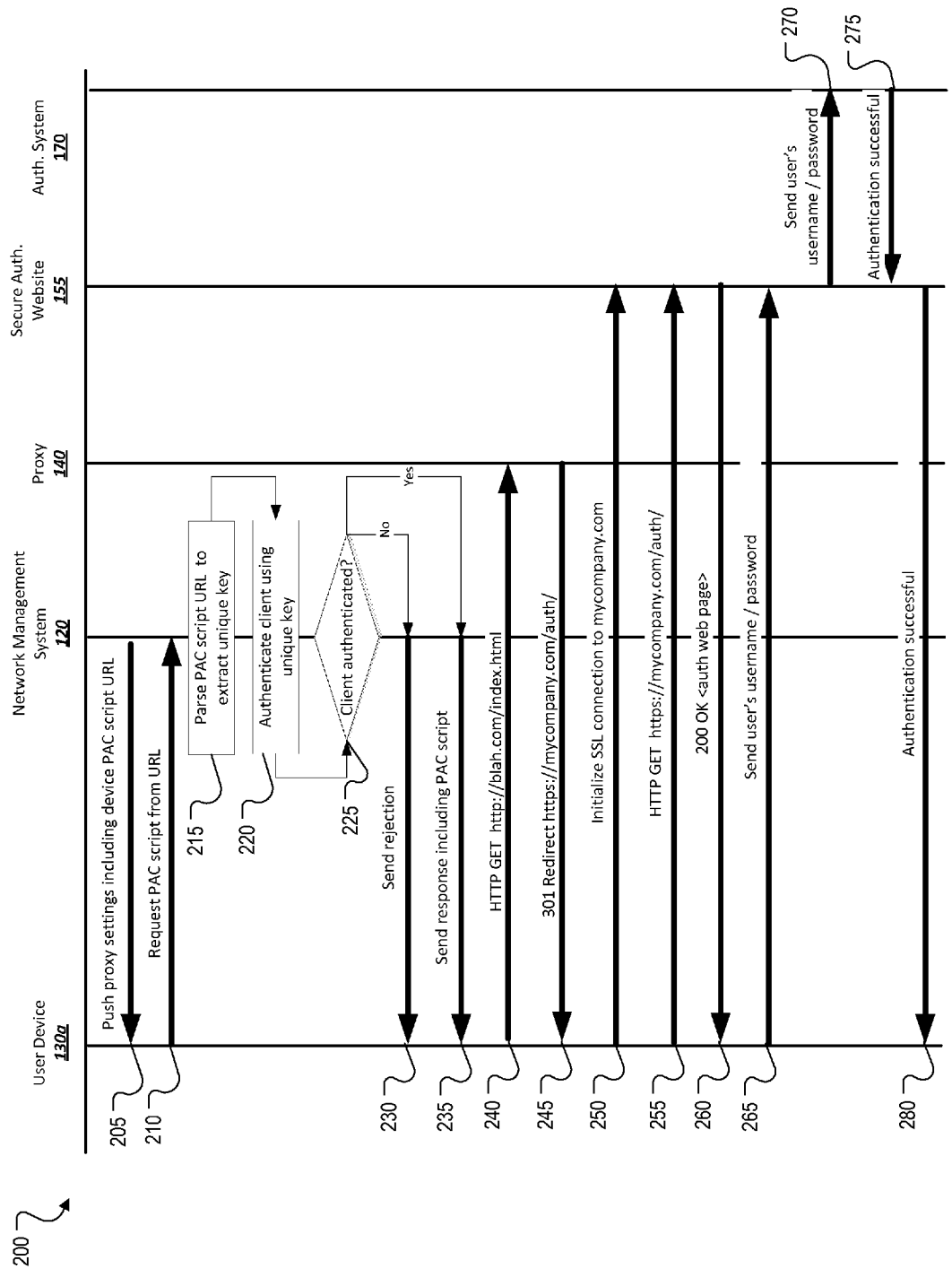
FIG. 2 is a message flow diagram of an example interaction between the components of the example network to perform device authentication via proxy automatic configuration script location.

FIG. 2 is a message flow diagram of an example interaction between the components of the example network to perform device authentication via proxy automatic configuration script location. In some implementations, the interaction 200 may include additional and/or different components not shown in the message flow diagram. Components may also be omitted from the interaction 200, and additional messages may be added to the interaction 200.

At 205, the network management system 120 pushes proxy settings to the user device 130a including a PAC script URL specific to the device. In some implementations, the network management system 120 constructs the PAC script URL by appending a unique key for the device 130a to a base URL. The network management system 120 may also construct the PAC script URL to refer to the file name of a PAC script file stored on the network management system 120.

In some cases, the network management system 120 may push proxy settings to the user device according to one or more network management protocols, including, but not limited to, DHCP, BOOTP, and/or other protocols.

At 210, the device 130a requests a PAC script from the PAC script URL it received from the network management system 120 at 205. In some cases, these are device 130a request the PAC script via HTTP, such as by sending an HTTP Request for the PAC script URL. The device 130a may also request the PAC script via other mechanisms or protocols.

At 215, the network management system 120 parses the PAC script URL to extract the unique key. In some implementations, the PAC script URL may be included in the PAC script file name in the URL. The unique key may also be included in other portions of the request, such as in a header, a parameter, and/or other parts.

At 220, the network management system 120 authenticates the client using the unique key. In some implementations, authenticating the client using the unique key includes querying the database for unique key of the device that sent the PAC script request, and comparing the unique key for the device to the unique key received. In such an implementation, if the unique key from the database matches the unique key from the request, the client is authenticated. If the unique key from the database does not match the unique key from the request, the client is not authenticated.

At 225, a determination is made whether the client is authenticated. If the client is not authenticated, a rejection is sent to the user device 130a at 230. In some implementations, the rejection may include a message indicating the client was authenticated. The rejection may also include a PAC script file that will direct the device to a proxy server that will block its access to the Internet 150. The rejection may also include any other mechanism of restricting the access of the device 130a to the Internet 150, indicating to the device 130a that its access to the Internet 150 is restricted, and/or any other action related to restricting network access of the device 130a.

If the client is authenticated, the network management system 120 sends a response at 235 to the user device 130a. The response includes a PAC script including instructions to be executed by the device 130a for accessing the Internet 150.

At 240, user device 130a sends a request via HTTP for the website associated with the URL http://blah.com/index.html. The proxy server 140 may examine this HTTP request and determine that it is originating from a device with an unauthenticated user. For example, the proxy server 140 may consult the network management system 120 and determine that the user device 130a is authenticated only with the PAC script unique key but not with a user-specific username and password. Proxy server 140 may also determine that the user device 130a is assigned a limited access profile such that it can access only the secure authentication website 155.

In response to determining that the user device 130a is authenticated only with a PAC script unique key, the proxy server 140, at 245, sends a redirect message to the user device 130a directing it to the secure authentication website 155. In some implementations, the redirection may be an HTTP redirect message including a URL associated with secure authentication website 155, as shown in FIG. 2. The redirection may also involve the proxy server 140 communicating with the secure authentication website 155 on behalf of the user device and forwarding the response page to the user device 130a.

At 250, the user device 130a initializes an SSL connection to the secure authentication website 155. In some implementations, 230 may involve handshaking or other interaction between the user device 130a and the secure authentication website 155. Although the secure connection is illustrated as an SSL connection in FIG. 2, other types of secure connections may be used, including, but not limited to, Transport Layer Security (TLS), Multiplexed Transport Layer Security (MTLS), connections where data is encrypted prior to transport with an encryption algorithm such as Advanced Encryption Standard (AES), and/or any other suitable technique.

At 255, the user device 130a sends an HTTP request to the secure authentication website 155. In some implementations, the HTTP request includes the redirection URL sent by the proxy server 140 at 245. At 260, the secure authentication website 155 responds with an authentication webpage. In some implementations, the authentication webpage includes features allowing the user of the user device 130a to enter a user-specific username and password into the authentication webpage. At 265, the user-specific username and password are then sent to the secure authentication website, such as, for example, when the user submits the authentication webpage. At 270, secure authentication website 155 sends the user-specific username and password to the authentication system 170 for verification. As discussed previously, this interaction may occur via a network protocol such as LDAP, via an API, or by any other suitable mechanism. At 275, the authentication system responds with indication that authentication was successful. In some implementations, if the user-specific username and password are not verified, the authentication system 170 may return an indication that authentication was not successful.

At 280, secure authentication website 155 sends an indication that authentication was successful to the user device 130a. In some implementations, this indication may be a webpage indicating successful authentication. Such a webpage may inform the user that they have successfully authenticated and are now free to browse the wider Internet.

Figure 3:
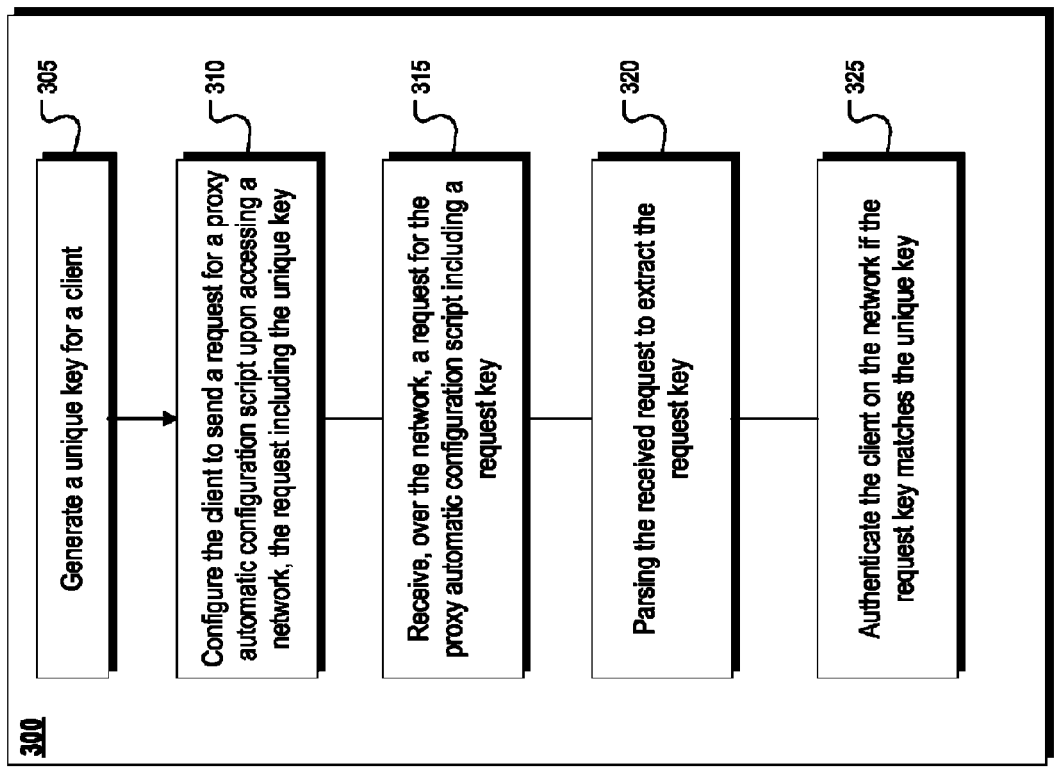
FIG. 3 is a flow chart of an example process of performing device authentication via proxy automatic configuration script location.

FIG. 3 is a flow chart of an example process 300 of performing device authentication via proxy automatic configuration script location.

At 305, the unique keys generated for a client. In some implementations, the unique key may be generated by the network management system 120. The unique key may be generated according to parameters provided by a network administrator, such as, for example to contain a certain number of characters for a maximum number of characters. The unique key may be generated by performing a numerical operation on identifier associated with the client, such as by performing a hash on a client identifier.

At 310, the client is configured to send a request for a proxy automatic configuration script upon accessing the network, the request including the unique key. In some implementations, configuring the client includes sending configuration information to the client via a known configuration protocol, such as DHCP, BOOTP, and/or other protocols.

At 315, a request is received for the proxy automatic configuration script. The request includes a request key. In some implementations, the request may be received via HTTP, such as in the form of an HTTP GET request including the request key as part of the requested URL. The request for the PAC script may also be received according to HyperText Transfer Protocol Secure (HTTPS).

At 320, the request is parsed to extract the request key. In some cases, parsing the request includes parsing the requested URL to extract the request key. Parsing the request may also include parsing headers or parameters included in the request to extract the request key At 325, the client is authenticated on the network if the request key matches the unique key. In some implementations, authenticating the client on the network includes allowing the client to access the network.

In some implementations, the PAC script is sent to the client after authenticating the client on the network. The PAC script may be sent to the client via a network protocol, such as HTTP, File Transfer Protocol (FTP), and/or other network protocols. The PAC script may include instructions to be executed by the client when connecting to the Internet. The instructions may be coded in a programming language such as JavaScript, Python, Perl, PHP, and/or other programming languages.

In some cases, the request for the PAC script comprises a URL associated with the proxy automatic configuration script. The URL may correspond to a file name for a stored PAC script file. In some cases, the URL may indicate a PAC script file, but may not correspond exactly to the filename for the PAC script file. For example, the system may return a PAC script named "standard.pac" in response to a request for URL "example.com/standard-12345.pac," where "12345" is the unique key.

After authenticating the client at 325, a user of the client may be authenticated based on user-specific credentials associated with the user and different than the unique key. For example, the user may be authenticated by the service authentication website 155 via the authentication system 170, as described relative to FIG. 1.

In some implementations, the client is a network device such as a cell phone, a laptop, a desktop, and/or other devices. The client may also be a user of a network device. In some cases, the client may be a software program running on device, such as a web browser.

In some instances, the process 300 includes determining a first address associated with the request. The first address is then associated with the unique key. A second request for the PAC script is then received over the network including the unique key, the second request being from a second address different than the first address. A second client associated with the second address is then blocked from accessing the network.

In some cases, it may be determined that the first client is no longer associated with the first address, and the first client may be de-authenticated from the network. The de-authentication of the first client may also occur after a configured period of time.

Figure 4:
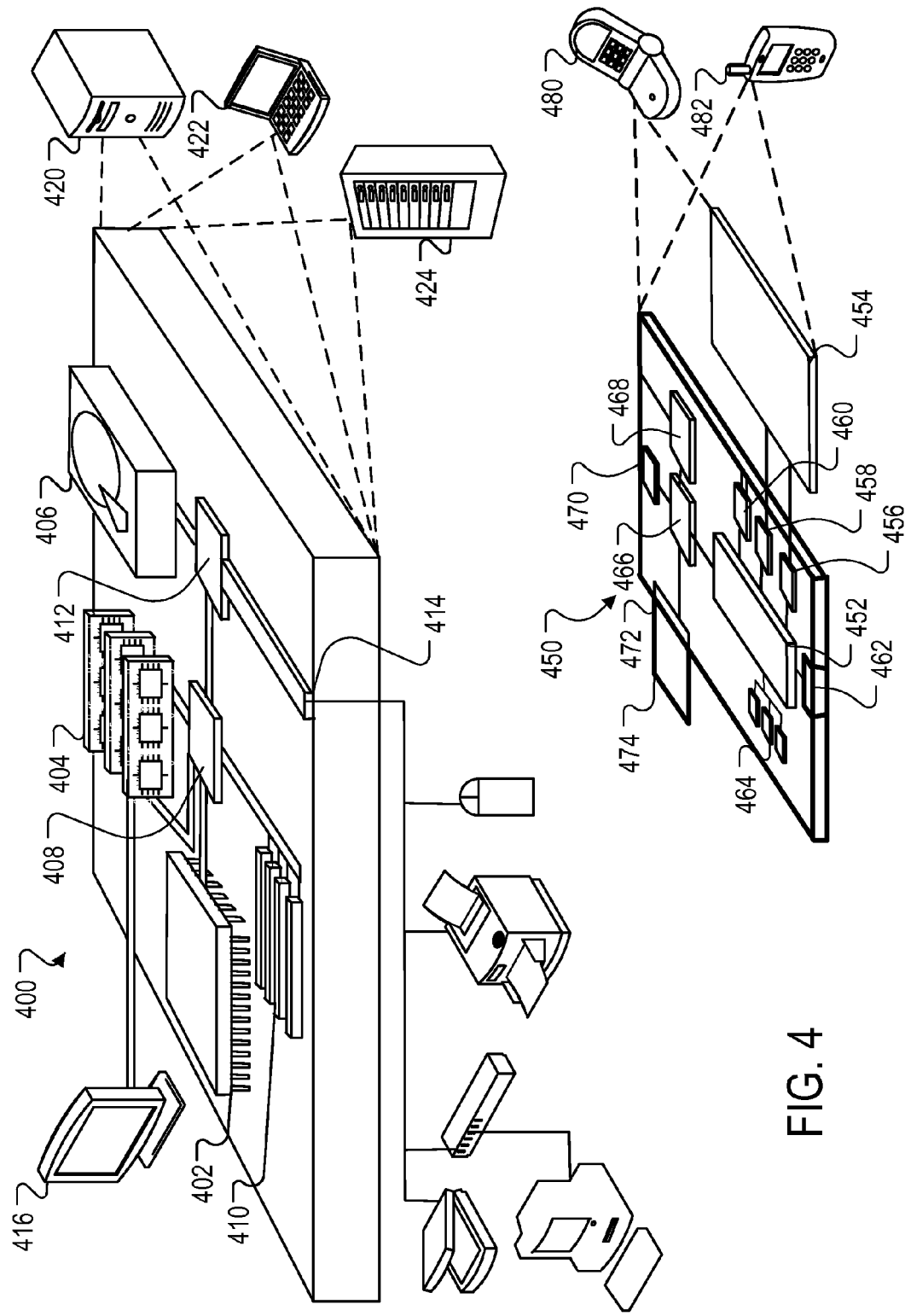
FIG. 4 is a diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 452 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user, as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method executed by a network management system including one or more processors, the method comprising:
   generating, by the one or more processors of the network management system, a unique key for a client device;
   configuring, by the one or more processors of the network management system, the client device to send a request for a proxy automatic configuration (PAC) script upon accessing a network, the request including a PAC script uniform resource location (URL) associated with the PAC script, the PAC script URL including the unique key;
   receiving, by the network management system over a network, a request for the PAC script including requested PAC script URL including a request key;
   parsing the requested PAC script URL to retrieve the request key;
   authenticating the client device on the network, by the network management system, if the request key matches the client device's unique key;
   determining, by the network management system, a first address associated with the request, wherein the first addresses is a Media Access Control (MAC) address or Internet Protocol (IP) address;
   associating, by the network management system, the first address with the unique key;
   sending, by the network management system, the PAC script associated with the requested PAC script URL to the client device in response to authenticating the client device on the network;
   receiving, by the network management system, over the network, a second request for the PAC script including the unique key and a second address wherein the second address is a Media Access Control (MAC) address or Internet Protocol (IP) address; and
   in response to the determination that the second address is different from the first address, blocking, by the network management system, a second client associated with the second address from accessing the network.

2. The method of claim 1, wherein the request for the PAC script is received according to HyperText Transfer Protocol (HTTP).

3. The method of claim 1, wherein the request for the PAC script is received according to HyperText Transfer Protocol Secure (HTTPS).

4. The method of claim 1, wherein the client is a device and the method further comprises:
   after authenticating the client, authenticating a user of the client based on user-specific credentials associated with the user and different than the unique key.

5. The method of claim 1, wherein the client is a user of a device.

6. The method of claim 1, wherein the client is a web browser.

7. The method of claim 1, further comprising:
   determining that the first client is no longer associated with the first address; and de-authenticating the first client on the network upon determining that the first client is no longer associated with the first address.

8. The method of claim 1, further comprising de-authenticating the client on the network after a configured period of time.

9. A network management system comprising:
   a computer storage device for storing; and
   a processor coupled with the storage device to execute computer program instructions to:
   generate a unique key for a client device;
   configure the client device to send a request for a proxy automatic configuration (PAC) script upon accessing a network, the request including a PAC script uniform resource location (URL) associated with the PAC script, the PAC script URL including the unique key;
   receive, over a network, a request for the PAC script including requested PAC script URL including a request key;
   parsing the requested PAC script URL to retrieve the request key;
   authenticate the client device on the network if the request key matches the client device's unique key;
   determine a first address associated with the request, wherein the first addresses is a Media Access Control (MAC) address or Internet Protocol (IP) address;
   associate the first address with the unique key;
   send the PAC script associated with the requested PAC script URL to the client device in response to authenticating the client device on the network;
   receive, over the network, a second request for the PAC script including the unique key and a second address wherein the second address is a Media Access Control (MAC) address or Internet Protocol (IP) address; and
   in response to the determination that the second address is different from the first address, block a second client associated with the second address from accessing the network.

10. The system of claim 9, wherein the request for the PAC script is received according to HyperText Transfer Protocol (HTTP).

11. The system of claim 9, wherein the request for the PAC script is received according to HyperText Transfer Protocol Secure (HTTPS).

12. The system of claim 9, wherein the client is a device and the operations further comprise:
   after authenticating the client, authenticating a user of the client based on user-specific credentials associated with the user and different than the unique key.

13. The system of claim 9, wherein the client is a user of a device.

* * * * *